No. 790,594. PATENTED MAY 23, 1905.
A. S. RUDOLPH.
HARNESS ATTACHMENT.
APPLICATION FILED SEPT. 22, 1904.
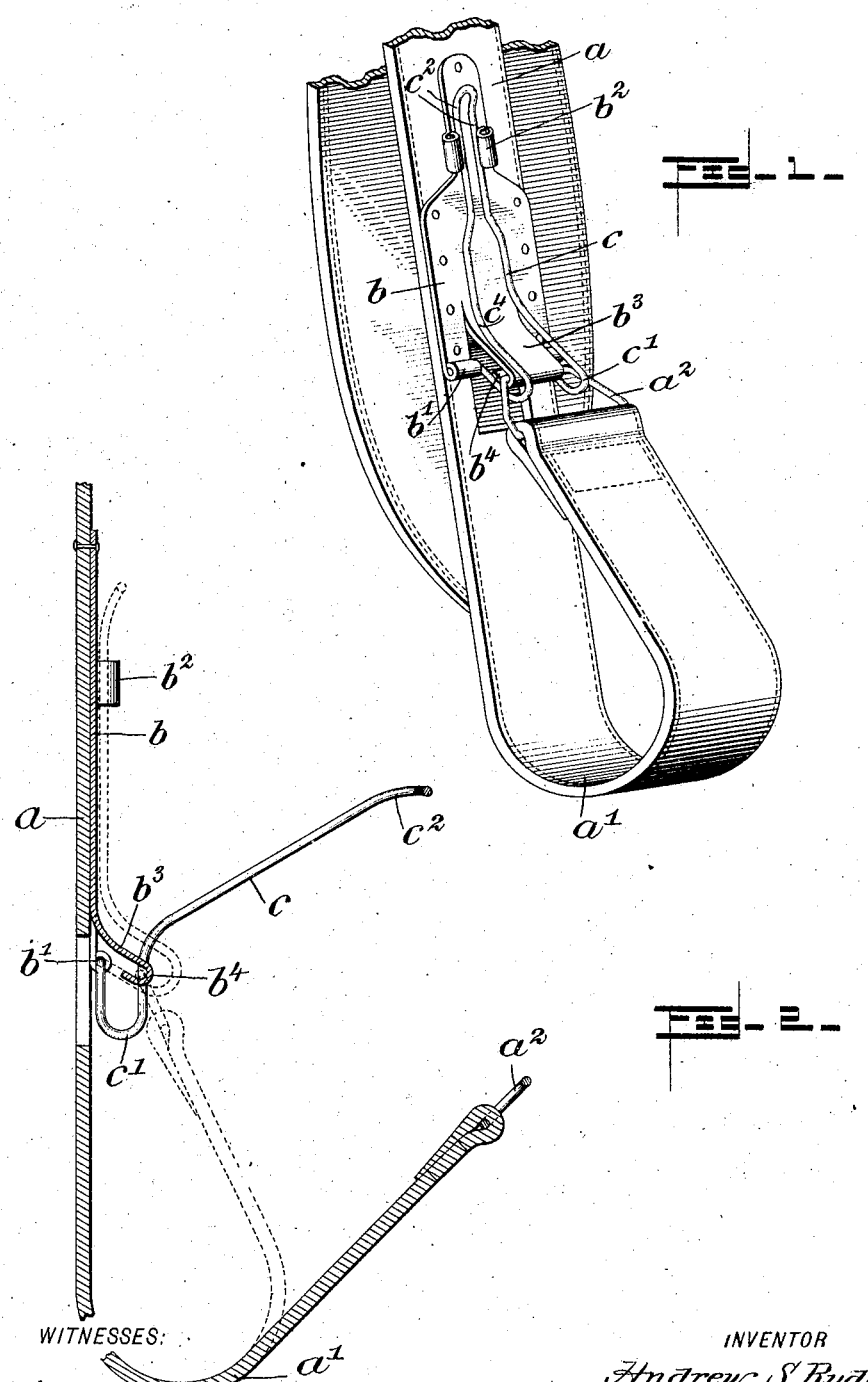
WITNESSES:
INVENTOR
Andrew S. Rudolph
BY
ATTORNEYS No. 790,594. Patented May 23, 1905.

UNITED STATES PATENT OFFICE.

ANDREW S. RUDOLPH, OF CARMI, ILLINOIS.

HARNESS ATTACHMENT.

SPECIFICATION forming part of Letters Patent No. 790,594, dated May 23, 1905.

Application filed September 22, 1904. Serial No. 225,462.

*To all whom it may concern:*

Be it known that I, ANDREW S. RUDOLPH, a citizen of the United States, and a resident of Carmi, in the county of White and State of Illinois, have invented a new and Improved Harness Attachment, of which the following is a full, clear, and exact description.

My invention relates to a harness attachment, and is especially designed for use in holding up the shafts of a vehicle, although it is to be understood that it may be employed for many other purposes.

In the present constructions of harness the shafts are held by straps which have been wound around them or through which the shafts have to be passed. Either of these operations consumes considerable time in the harnessing of horses; and it is the principal object of my invention to provide means for holding the shafts so arranged that the shafts can be attached to it by a very simple operation, thus avoiding both of the manipulations mentioned above.

Reference is to be had to the accompanying drawings, forming a part of this specification, in which similar characters of reference indicate corresponding parts in both the figures.

Figure 1 is a perspective view showing a practical embodiment of my invention. Fig. 2 is a central sectional view thereof, showing in dotted lines a second position of the parts.

A strap $a$ for supporting the shafts is turned back upon itself, thus producing a loop $a'$, in which the shaft is to be placed and by which it will be supported. The end of the strap is preferably provided with some means for securing it in this position, such means being represented by an eye $a^2$, formed of wire or any other suitable material.

$b$ represents a plate which may be employed for convenience, and it is intended to be firmly secured to the strap $a$. Upon this plate when used or upon the strap is pivoted a hook $c$. This hook is preferably formed of resilient material and is provided with a loop $c'$, in which the eye $a^2$ of the strap may be held. In the present form the hook is pivoted in curved ends $b'$ of the plate and the upper portion $c^2$ of the hook is held in raised position by means of projections $b^2$ upon the plate $b$. It will be readily understood, however, that these two features could be replaced by others and that the plate $b$ could be dispensed with without departing from the spirit of my invention.

The hook $c$ being movably mounted with respect to the shaft and preferably pivoted, it will be readily understood that upon placing the loop $a'$ around the bottom of the shaft and drawing the eye $a^2$ up to a point above the shaft the end $c^2$ of the hook may be thrust through the eye and the strap will be held in the position shown in Fig. 1 even if the hook $c$ is not secured at $b^2$ or in any equivalent way. To provide for this, the loop portion $c'$ is made long and depending from the point at which the hook is pivoted and the hook is bent backwardly at $c^4$, so that when it assumes the position shown in full lines in Fig. 2 the eye $a^2$ can be securely held at the bottom of the loop $c'$ without danger of being disengaged accidentally by any ordinary usage. It is desirable, however, that the hook be secured in the position shown in Fig. 1, and for that purpose fastening devices—as, for example, $b^2$—are preferably provided. The plate $b$ is also preferably provided with an offset $b^3$, upon which is mounted a hook $b^4$, preferably integral with the plate and adapted to receive the eye $a^2$, as shown in Fig. 1. With this hook in addition to the hook $c$ it will be observed that the eye is securely fixed and that there will be no danger of its becoming disengaged in use. By making the hook resilient and in one piece the portion $c^2$ will readily snap into position between the projections $b^2$ and be held by its own resiliency against motion. This arrangement will do away with the strap extending from the belly-band and wrapping around the shaft. It will also result in considerable saving of time, as well as the necessity of going from one side of the horse to the other in order to get the shafts into the loops. It may be easily attached to any set of harness, and it can be used with all modifications which are at present known.

While I have illustrated and described one practical embodiment of my invention, it will be readily understood that the invention is not limited thereto and that many modifications may be made therein without departing from the spirit of the invention.

Having thus described my invention, I claim as new and desire to secure by Letters Patent—

1. A harness attachment, comprising a strap having a loop for supporting a shaft, a hook movably mounted with respect to the strap, and having means for connecting it with the loop, and additional means for holding the loop.

2. A harness attachment, comprising a strap having a loop for supporting a shaft, a resilient hook pivotally connected with the strap, and means for securing the hook in fixed position.

3. A harness attachment, comprising a strap having a loop, a bodily-movable hook for supporting the loop, and means detachable from the hook for holding the hook in fixed position.

4. A harness attachment, comprising a strap having a loop, a movable hook for supporting the loop, and means for holding the hook in fixed position, said means comprising a pair of projections connected with the strap on opposite sides of the hook.

5. A harness attachment, comprising a strap having a loop, a hook pivoted to the strap and adapted for supporting the loop, said hook comprising two resilient wires, and means for holding the hook in fixed position near the strap, said means comprising a pair of projections adapted to engage the opposite sides of said resilient wires.

6. The combination with a strap having a loop, of a plate secured to the strap outside the loop and supported by the strap, a stationary device and a movable device both on the plate, for supporting one end of the loop.

7. The combination with a strap having a loop, of a plate secured to the strap outside the loop and provided with a hook for supporting a part of the loop, and additional means for supporting the loop.

8. The combination with a strap having a loop, of a plate secured to the strap outside the loop, and a resilient hook pivotally mounted on the plate, said plate having means for securing the hook in fixed position.

9. The combination with a strap having a loop, of a plate secured to the strap outside the loop and provided with a hook for supporting the end of the loop, and a hook pivotally mounted on the strap, also capable of supporting the end of the loop.

10. In a harness attachment, the combination of a strap having a loop near the end thereof and an eye in the end of the loop, a plate secured to the strap at a point outside the loop and provided with an integral hook extending therefrom and adapted to engage said eye, a second hook pivotally mounted upon the plate and having a depending portion also capable of engaging said eye, and a resilient portion extending therefrom and capable of assuming a position parallel with the plate, said plate being provided with projections capable of receiving said last-mentioned portion of the hook between them and holding the hook against pivotal motion.

In testimony whereof I have signed my name to this specification in the presence of two subscribing witnesses.

ANDREW S. RUDOLPH.

Witnesses:
W. A. BALL,
AUBURN KISNER.